Patented June 1, 1937

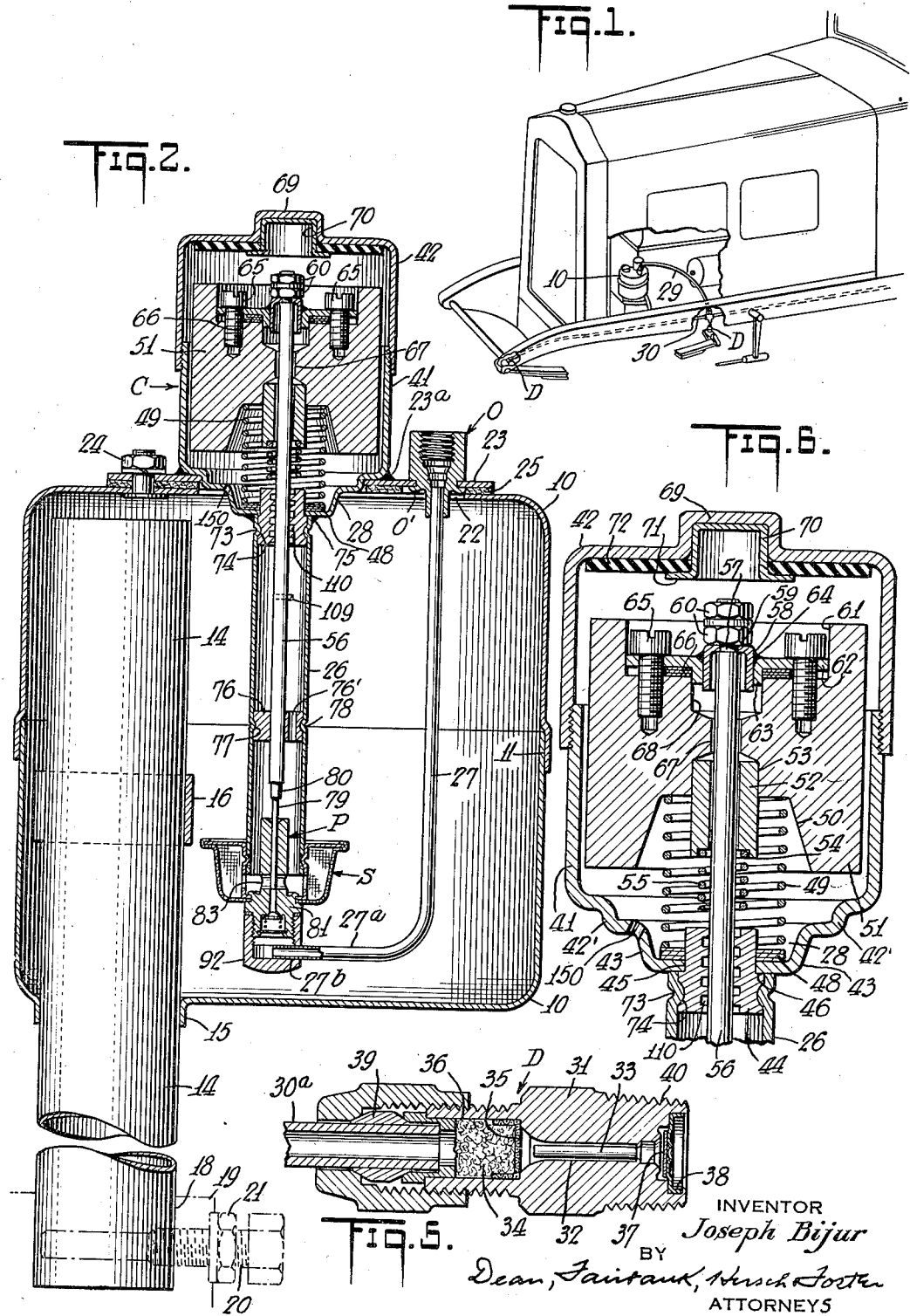

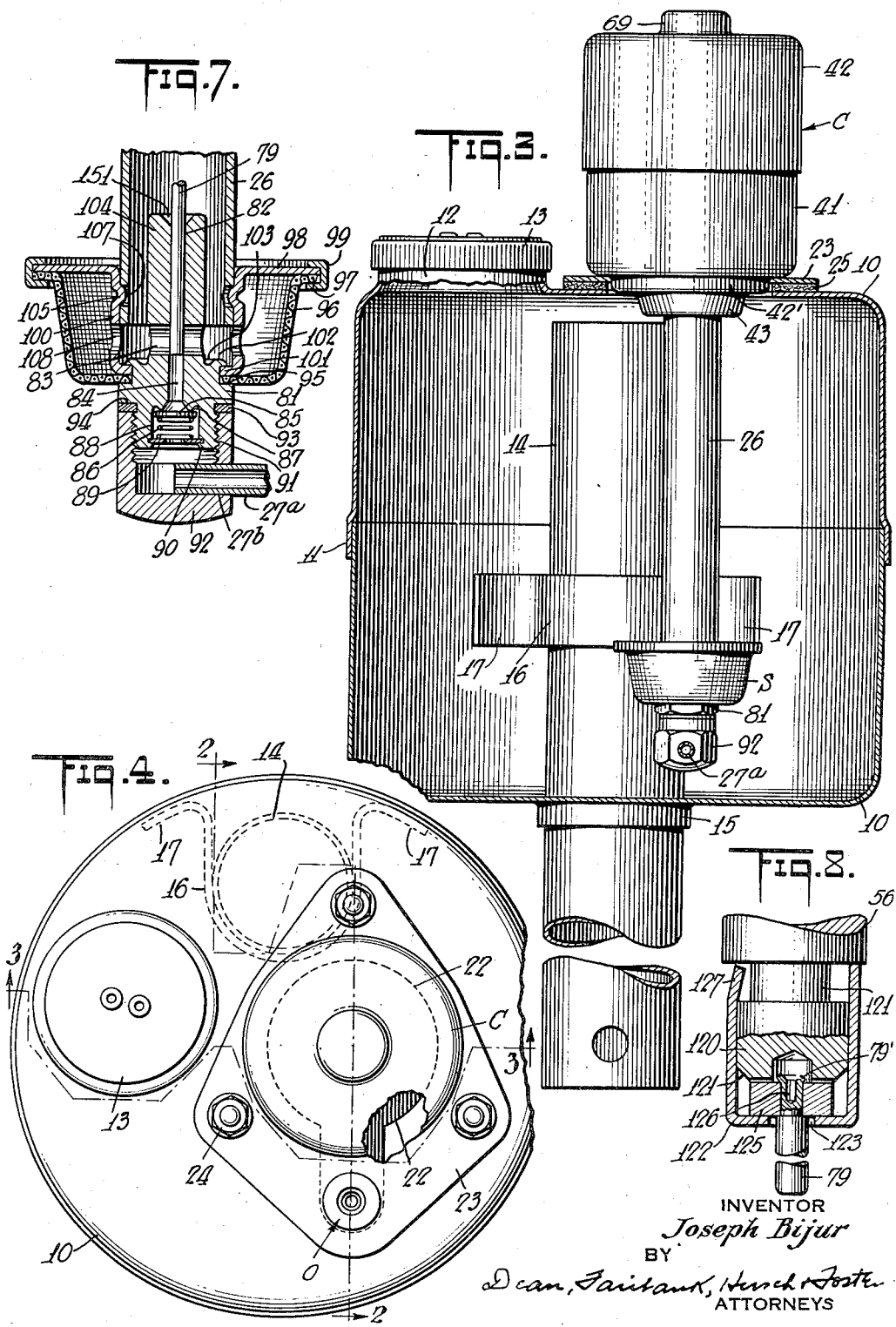

2,082,769

UNITED STATES PATENT OFFICE 2,082,769

LUBRICATION

Joseph Bijur, New York, N. Y., assignor to Auto Research Corporation, a corporation of Delaware Application December 17, 1930, Serial No. 502,929

10 Claims. (Cl. 184—27)

My present invention, while having a wide range of applicability, is primarily concerned with lubricating installations of the character in which oil from a central reservoir is fed through a distributing conduit system to the various bearings of a machine to be lubricated.

The invention finds its preferred use in an automatic lubricating installation for vehicle chassis bearings of the type in which a liquid filled conduit system with restricted flow proportioning outlets at the bearings is continuously fed with oil from a force pump.

The invention is further especially concerned with the construction of improved pump mechanism and the provision of an improved unitary reservoir, pump and pump motor assemblage which, while capable of many uses, is especially effective as the lubricant storage and feed control means of a system of the above type.

An object of the invention is to provide a system which delivers proper quantities of lubricant at the bearings and without excessive overflow and independently of temperature conditions or consequent variations in oil viscosity.

Another object is to provide a reservoir, pump and motor unit of light, rugged, durable construction, consisting of but few parts, capable of ready assembly and which permits the use of relatively light metal shells for the reservoir and motor pump housings with a relatively massive inertia weight as the motive means for the pump.

Another object is to provide an installation of the above type wherein the moving parts including the motor and the pump units are completely housed, guarded against tampering and against the access of dust, lubricated by clean oil without the use of accessory fittings and protected from deforming strain or injury of the more delicate parts thereof, during handling, transportation and use, regardless whether the device be upright or laid on its side.

Another object is to provide an inertia motor for a system of the above type which shall have a noiseless cushioned operation both in the intake and discharge stroke thereof, to prevent noise or shock and yet have sufficient freedom of movement to permit the inertia weight to produce an operating stroke for effective discharge even when oil of high viscosity is used.

Another object is to provide an installation of the above type of substantially universal applicability to motor vehicles of various designs with various different lubricant needs which may initially be readily adjusted to meet requirements of the particular use to which it is to be put and which is yet substantially tamper-proof while in use.

Another object is to provide an installation of the above type in which a supply of strained lubricant is at all times maintained within the tank available for operation of the pump plunger thereon.

Other objects will be in part obvious and in part pointed out hereinafter.

In a preferred embodiment the reservoir comprises a metal shell, upon the top of which may be mounted the inertia motor casing and within which adjacent the bottom thereof may be suspended a pumping mechanism by means of a tube depending from said motor casing. The pump mechanism includes a diminutive plunger which is rigidly connected to an inertia weight within said casing by means of a connecting rod guided within said tube, the weight floating upon a light spring and having an associated stiff buffer spring therebelow which limits the depression of the pump plunger in the discharge stroke. For convenience of construction and assembly, the casing of the motor, the tube and the pump outlet may all be carried on a common supporting plate secured over an opening in the top of the reservoir shell, enabling complete assembly of the motor and pump and application of such assembly to the reservoir.

In the preferred embodiment a ported pump is utilized and adjustments are provided whereby the inertia weight may be balanced to fix normal quiescent position of the bottom of the plunger so that it will just close the inlet to the pump cylinder and also whereby the output of the pump may be determined by varying the effective length of the plunger stroke without varying said normal plunger position.

In the accompanying drawings, which show one of the various possible embodiments of the several features of the invention:

Fig. 1 is a perspective view of the forward end of an automobile chassis with a portion of the hood and a portion of one chassis frame bar broken away to expose the reservoir and pump unit of the chassis system, and the means for connecting such unit to the distributing piping in the system;

Fig. 2 is an enlarged vertical sectional view through the pump and motor unit upon the line 2—2 of Fig. 4;

Fig. 3 is another vertical sectional view upon the line 3—3 of Fig. 4;

Fig. 4 is a top plan view of the unit with parts broken away;

Fig. 5 is a longitudinal sectional view of one type of flow control fitting which may be used at the outlets of the chassis system;

Fig. 6 is an enlarged sectional detail of the inertia motor and associated mechanism, as shown in Fig. 2;

Fig. 7 is an enlarged sectional detail of the pump, the filter screen and their associated mechanism, as shown in Fig. 2 and Fig. 8 is an enlarged sectional view showing the connections between the connecting or actuating rod and the plunger.

Referring first to Figures 1, 2 and 3 of the drawings, the reservoir unit may comprise a metal shell consisting of the two cup-shaped members 10, the mouths of which are telescoped at 11. As shown, the reservoir is of metal, but if desired it may be constructed partly or wholly of a non-metallic transparent material such as glass. The top of the reservoir is provided with a filling neck 12 normally closed by a vented filler cap 13 and with an opening 22 (see also Fig. 4) therein of general key-hole shape adapted to be covered by an irregularly shaped plate 23 which carries the entire motor-pump assembly as hereinafter described. Plate 23 may be relatively heavy and stiff in construction and serves to mount the motor casing designated generally at C, as well as the outlet designated generally at O to the chassis distributing system.

The pump mechanism designated generally by the reference numeral P is hung from the motor casing C by a cylinder 26 and is encircled by a filter cup or screen S. The pump outlet is connected by a pipe 27 to the tank outlet O. The pump assembly is inserted as a unit into the shell through the opening 22, the narrower portion of this opening accommodating the outlet O and the larger portion of the opening accommodating the generally pendant reduced motor casing extension 28 and being sufficiently large to permit passage of the filter cup S therethrough. The carrying plate 23 is bolted to the tank as at 24, against a similarly shaped and interposed gasket 25.

The outlet O is connected by pipe 29 to the main distributing conduit system 30 of the chassis. This system preferably comprises a plurality of freely communicating small bore pipes with suitable lubricant dividing or metering devices such as drip lug fittings preferably of invariant high flow resistance which are at or adjacent the respective bearings to be lubricated, examples of which are shown and described in my Patents Nos. 1,632,771, 1,746,139 and 1,732,212.

A suitable type of fitting, usually known as a drip plug is indicated at D in Fig. 5. The fitting D here shown is merely illustrative of the general type of flow control outlets employed and it is to be understood that numerous types of generally equivalent outlet devices might be employed. The fitting consists of a body 31 having a central accurately machined bore 32 therein substantially filled by a restriction pin 33. A wad of filter material 34 with a wire mesh screen backing 35 is secured in a socket 36 at one end of the body 31 and at the other end of such body a suction flap valve 37, secured by a retainer disk 38, acts to prevent inter-pipe syphoning between flow control fittings at different levels. The terminal end 30a of one of the distributing conduits is secured to the fitting by a compression coupling arrangement 39 and the fitting is applied at a corresponding hole in the stationary part of a bearing member by the externally threaded end 40 thereof. Preferably the bores of all of the outlet fittings are of the same diameter and the relative ratings of emission of the fittings are determined by the size of the restriction pin 33 which is used, these pins being made up in various standard diameters.

Referring to the motor mechanism (see particularly Fig. 6), the motor casing is formed by the generally cup-shaped members 41 and 42 threadedly connected. Preferably the threads are shellacked so as to make the attachment between the cup-shaped members 41 and 42 substantially air-tight. The bottom of the lower cup member 41 has a reduced pendant portion 42' to pass through and substantially fit an opening in the plate 23, and is further reduced at 43 defining the depression or well 28.

A connecting rod guide bearing 44 includes a reduced upper portion projecting through a corresponding opening 45 in the bottom of the cup 41, and an upwardly facing shoulder 46 which abuts the bottom of the cup. Disks or shims 48 encircling the bearing 44 and resting on the bottom of the well 28 serve as reaction members for a coiled expansion or floating spring 49. The upper end of the spring enters a socket 50 in the bottom of a generally cylindrical inertia weight 51 which floats on the spring. The spring preferably is a light or open spring which will be compressed a substantial distance by the weight 51. The road unevenness will cause the desirable short reciprocating movement of the weight supported as set forth. The reduced portion 43 of the casing and the socket 50 in the weight 51 are conical or slope outwardly so that there will be little possibility of the spring touching the sides of such socket or depending portion.

A sleeve 52 has its upper end drive fitted into a reduced upward extension 53 of socket 50. This sleeve projects downwardly and has a flange 54 at its lower end permanently engaging the upper convolution of a relatively strong helical buffer spring 55, the lower end of which is adapted to strike against the top of the bearing 44 and limit the downward movement of the inertia weight. The buffer spring will move with the weight and will be accurately centered by said sleeve so as to eliminate possibility of frictional contact with the connecting rod 56.

The weight 51 has small clearance, as shown, with respect to the wall of the casing 41. The projecting lower end of the motor case 41 has a vent 150 communicating with the interior of the reservoir 10. The upper side of the inertia weight is rigidly affixed to the upper end of a connecting rod 56 which operates the pump. The connecting rod 56 at its upper end is reduced in diameter at 57 providing a shoulder upon which an inverted cup member 58 is adapted to seat. The extension 57 is preferably threaded for the reception of a pair of nuts 60, one of which serves as a lock nut. A circular pocket 61 in the top of the weight accommodates an annulus rigidly connected to the weight by bolts or screws 65 and having a central pendant flange 63 which is soldered at 64 to the inverted cup member 58. For a purpose to be more fully hereinafter explained, any suitable number of shims 66 interchangeable with shims 48 may be interposed between the disk 62 and the bottom of the socket. The connecting rod 56, preferably of hardened and tempered tool steel, passes with clearance through the reduced axial bore 67 of the weight between the inner end 68 of the socket 61 and the inner end 53 of the socket 50. The inverted upper cup 42 of the motor casing may have a socket extension 69 pressed upwardly and a retainer cup 70 press-fitted into this socket and flanged or spun over at 71 to secure a cushioning disk 72 of rubber, vellumoid or other suitable material against the inner face of the motor casing top. The cup 70 also accommodates the upper protruding end of rod 56 at the upper end of the pump stroke.

The pendant cylindrical sleeve 26 above referred to serves to provide suitable slide bearings for the connecting rod 56, and at its lower end it carries the pump and filter mechanism. It also serves as a reservoir for filtered lubricant to be supplied to the pump. This sleeve closely adjacent its upper end is pressed inwardly at 73 into an annular groove 74 in the bearing block 44 (see Fig. 6) and the top of the sleeve is soldered or otherwise secured to the bottom of the motor casing C. A second slide bearing block 76 (see Fig. 2) guiding the lower end of the connecting rod 56 is held in place by spinning the cylinder 26 into a circumferential groove 77 in block 76, and has a port 76' therein, through which the oil can find a level common to that in the tank.

The connecting rod 56 is coupled at its lower end to a pump plunger 79, the plunger constituting the expelling element of the pump P which is assembled with the filter S and bodily applied to the lower end of the cylinder 26. In one desirable form of such coupling (Fig. 8) the connecting rod 56 provided with an extension of reduced diameter 120 which is further reduced by a peripheral groove to form a neck 121. The upper end of the plunger 79 is riveted at 79' to a metal washer 125 and extends with substantial clearance through an axial opening 123 in the end of retainer cup 122 which holds said washer against the end of extension 120, and is itself assembled to the connecting rod by indentations 127 at the rim thereof extending into the groove about neck 121.

The assembly of the pump body and strainer assembly is most clearly shown in Fig. 7 wherein the pump body 81 is provided with a central longitudinal bore 82 in which the unpacked small bore pump plunger 79 works. The bottom of the pump body 81 is also reduced and externally threaded at 91 for the reception of a screw cap 92 screwing onto the body and abutting a gasket 93 which lies against a downwardly facing shoulder 94 of the body. The inlet end 27a of the pipe 27 enters the cap 92 through a suitable opening 27b therein. As seen in Fig. 3, the exterior of the cap 92 is preferably of hexagonal or other polygonal cross-sectional shape to enable convenient wrench application.

A generally cup-shaped filter screen 96 of closely woven wire mesh, has a central opening therein, the edges of which rest on a shoulder 95 formed on body 81. The upper outwardly turned lip 97 of the filter cap 96 is clamped together with the edge of a stiff metal annulus 98 by a ring 99. A cylindrical hub 100 on the annulus 98 is formed at its bottom into an inturned lip or flange 101 engaging the bottom of screen 96 against which it is clamped by outwardly spinning of the body of the pump block as at 102, thereby pressing the inner rim of screen 96 against shoulder 95. To facilitate this spinning operation, the body is further shouldered as at 103 so as to cooperate with a spinning tool of hollow construction adapted to fit over the upstanding reduced end 104 of the body and engage the shoulder 103. The hub 100 has indentations 105 which snap into corresponding apertures 107 in sleeve 26 for installation of the pump-strainer assembly just described. The hub 100 also has ports 108 substantially aligned with the pump inlet ports 83 in assembled position as shown.

The egress of oil from this cylinder 84 is normally blocked by a spring check valve 85 forced by coil spring 86 against a downwardly facing seat 87 disposed within a socket 88 in the bottom of the body 81. This spring reacts against a disk 89 staked at 90 near the mouth of the socket 88.

While the various elements of the lubricant supply unit may be made in proportion or dimensions suited to the particular use to which the device is put, the application of the device for pleasure automobile chassis lubrication elements makes certain dimensions and proportions particularly suitable for universal application to various widely different makes of automobiles. As an example of such application the weight may be approximately ¾ pound and the floating spring of such character that it will be compressed to about ⅓ its unstressed length by such weight. The spacing between the side of the inertia weight in the casing may be about $\frac{1}{32}$ inch and the diameter of the connecting rod may be approximately $\frac{5}{32}$ inch. Usually it is desirable to adjust the weight 51 and the floating spring 49 together with the spacing shims 48 and 66 so as to give the plunger a normal stroke of about $\frac{1}{16}$ or ⅛ inch with a $\frac{1}{16}$ inch plunger diameter, the spacing shims 48 and 66 preferably consisting of metal annuli of $\frac{1}{64}$ inch thickness.

The assembly of the installation is apparent from the previous description. The pump piston in its cylinder P, the pump rod in its sleeve 26 and the motor weight in its enclosing casing C are all preassembled upon the plate 23 which also mounts the outlet O, the lower end of this assembly being passed through the opening 22 in the top of the tank and plate 23 being secured to the tank by the nuts 24 with the motor protruding upwardly.

In operation, the movement of the vehicle whether upon a smooth or rough, a level or hilly road, causes a reciprocatory movement of the weight 51. The maximum amplitude of the effective stroke is constant, the weight being limited on the downstroke by the contact of the buffer spring 55 with the bushing 44. The weight is also limited on the upstroke by the vellumoid stop 72. The movement of the weight is somewhat damped by the retarded favorable interchange of air through the narrow crevice between the weight and the casing from the upper to the lower side thereof on the upstroke and conversely on the downstroke. Each downstroke of the motor is transmitted through the rod 56 and the piston 79 to eject lubricant that has previously filled the pump cylinder below port 85. The oil is propelled past valve 81, through pipe 27 to outlet O and thence through the distributing system. On each upstroke of the weight the piston is lifted out of the cylinder, permitting lubricant to flow through the port 83 to refill the cylinder with clean lubricant, the lower end of the cylinder having been closed by the valve 85 after the discharge impulse all in readiness for the next discharge.

The reciprocation of the pump occurring with a frequency during operation of perhaps 200 or more per minute and the individual discharges being minute, in the order of .01 cc, the pump will feed lubricant at rate corresponding to the chassis requirements. In view of the limited resiliency of the pipe walls and the small amount of air that may be contained therein, the rapid succession of minute pulsations may be integrated into a substantially continuous feed to the bearings through drip plug outlets such as are shown in Fig. 5.

The weight 51 is supported in such position in regard to the stops and the spring 49 is of such characteristics and is compressed sufficiently by said weight so that the combination will be at maximum sensitivity to vehicle vibration. In such case satisfactory pumping will ensue when the vehicle is travelling over smooth roads with little vibration and excessive lubrication will not result when the vehicle is travelling over rough roads, the weight in such latter case contacting against the stops with increased force. The output of the pump will not be substantially changed from summer to winter, the weight having such power that its movement will not be materially damped by increased back pressure in winter, due to increased line resistance, said back pressure often amounting to as high as 100 pounds per square inch, as contrasted to a summer pressure of frequently as low as 1 pound or less.

For best operation the lower end of piston rod 79 should normally be substantially flush with the lower edge of pump port 83. This is assured in original motor-pump assembly prior to installation of valve 85, by first properly balancing the weight 51 in respect to the stop 44 for the stroke desired by the insertion or removal of shims 48 so that said weight in quiescent condition projects a desired distance above the top of the cup 41. The floating spring is then removed, the weight 51 reinserted with the bottom of the buffer spring 55 resting upon the guide 44 and the connecting rod and plunger assembly 56—79 inserted into and through the bore 67, the guides 44 and 76 and the cylinder 82, a templet pin having been inserted through the lower end of the pump cylinder to limit the insertion of the plunger to its lowermost stroke position and a soldered connection being then made between cup 58 and disk 62. Thereupon, the weight 51 is lifted after removing nuts 60, the floating spring 49 reinserted and the complete assembly finally made.

The stroke or pump output may be readily adjusted at the factory or service station without changing the normal plunger position by transferring one or more shims from 66 to 48 to increase the stroke, or reversely to decrease the stroke, the transfer of each shim serving to change the stroke by a distance equivalent to its thickness.

If at any time the floating spring 49 sags, the weight 51 may be re-elevated to its proper balancing position by the insertion of additional shims 48.

The pump piston derives its discharge at all times from the contents of tube 26, which becomes filled with strained oil to substantially the level of oil in the main reservoir. The cleanness of the contents of tube 26 is assured, since the oil cannot find its level in said tube, except by traverse of the strainer S. The difficulty of sucking oil rendered viscous in cold weather past the more or less resistant strainer S by the action of the small pump is thus obviated.

By way of example, the reservoir is shown as mounted upon the crank case of the motor vehicle by means of an inlet tube 14 extending nearly the full height of tank 10 and protruding below the bottom thereof for insertion into the crank case filler opening 19 to which it may be clamped by the conventional bolt or screw 20 locked against backing out by nut 21. Pipe 14 may be preassembled as a part of tank 10 by soldering or welding it to the neck 15 on the bottom of the tank and to the strap 16, the ends 17 of which (Fig. 4) lie against and are spot welded to the inner face of the reservoir shell. By this arrangement it is possible to fill the chassis lubricating reservoir simultaneously with the filling of the crank case.

The opening 150 will serve both as a vent to permit expansion or contraction of the air in the motor casing C and as a drain to prevent lubricant collecting in the bottom of the casing C to above the level of said opening where it might impede the operation of the weight. Since the vent 150 communicates with the reservoir it will not readily admit dirt or dust as would an exposed vent opening.

To guard against disassembly of the motor and pump by tamperers, the bushing 44 is preferably provided with a helical groove 110 in its bore in anti-clockwise direction so that transverse pin 109 in the piston rod 56 would block any effort to remove the weight unless the same were simultaneously raised and rotated in clockwise direction, a movement that none but the initiated would be apt to perform.

While the motor and pump assembly is obviously not subjected to injury during use, it has been designed to be substantially proof against injury even in the course of handling or transportation prior to use. For this purpose the upper end of the bore of pump cylinder 104 is beveled to facilitate entry of the pump piston in assembly. The pump cylinder plug protects the small piston rod and by virtue of the minute clearance between the motor weight and its casing, no damaging bending moment can be exerted by said weight upon the connecting rod even though the parts be laid on their side during shipment and be subjected to considerable vibration in such position.

As many changes might be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:

1. An inertia pressure-creating mechanism for a lubricating system comprising a plunger pump with a vertical plunger, a connecting rod extending vertically upwardly from said plunger, an inertia weight connected to the top of said connecting rod, a spring adapted to float said weight and means to determine the throw of said plunger, including adjusting means to elevate and lower the floating spring.

2. An inertia pressure-creating mechanism for a lubricating system comprising a plunger pump with a vertical plunger, a connecting rod extending vertically upwardly from said plunger, an inertia weight connected to the top of said connecting rod, a spring adapted to float said weight and means to determine the throw of said plunger, including adjusting means to elevate and lower the floating spring, said adjusting means consisting of replaceable shims, the insertion of which cause the elevation of the lower portion of the floating spring and the removal of which cause corresponding depression.

3. In an inertia pump mechanism, an adjustable inertia weight having a socket in the upper face thereof, a connecting rod extending through a bore longitudinally of said weight into said socket, a plate attached to the upper part of said connecting rod and lodged in said socket, spacing means determining the distance between the bottom of said socket and said plate, a floating spring reacting against and extending downwardly from said weight, a fixed support for said floating spring below said weight and spacing means determining the elevation of the floating spring.

4. In a mechanism for adjusting the throw of an inertia weight operated plunger ported pump combination provided with a connecting rod between the weight and the pump in which the weight is supported upon a floating spring, comprising means to elevate and lower the floating spring and means to elevate and lower the connecting rod relative to the weight, said means coacting together to vary the magnitude of the stroke of the plunger without changing its normal position in the plunger chamber.

5. An inertia motor mechanism comprising a resiliently supported weight and a casing closely fitting the sides of said weight, but substantially spaced above and below said weight so as to form air chambers thereabove and therebelow, the spacing between the side of the weight and the interior of the walls of the casing being such that the weight will encounter a substantial resistance in its upward and downward movement when it forces the air from one air chamber to another.

6. An inertia weight motor mechanism comprising a pump, a resiliently mounted vertically movable inertia weight, a casing therefor closely fitting the sides of the weight but sufficiently spaced from the top and bottom thereof to permit a desirable amount of vertical movement, a connecting rod of relatively small diameter and having negligible mass as compared to the weight and of the same diameter throughout its length from its connection to the weight to its connection to the pump and being directly connected to said weight and said pump and depending from said weight through the bottom of the casing and a guide for said connecting rod in the bottom of the casing, the spacing between the side of the weight and the casing, the flexibility of the connecting rod and the length of the connecting rod between its point of attachment to the weight and its point of support in the guide bearing in the bottom of the casing being so regulated that the rod may flex without deformation at its point of attachment to the weight a distance approximately equivalent to the average spacing between the side of the weight and the casing, said connecting rod being provided with a plurality of guiding means, one being located at the bottom of said casing and the other being located adjacent said pump, said guiding means being supported by a bracket depending from said casing.

7. A lubricant supply arrangement and a lubricating installation comprising a reservoir for the lubricant, a pump cooperating with said reservoir positioned in the lower part of said reservoir, a motor for said pump enclosed in a housing above said reservoir, a connecting rod operatively connecting said motor and said pump, a sleeve enclosing said connecting rod and extending downwardly to the vicinity of said pump, a plunger attached to the lower part of said connecting rod forming a part of said pump and a unitary plunger chamber-strainer-outlet assembly adapted to be attached to the lower part of said sleeve, said unitary assembly comprising a central vertical plunger chamber body adapted to be positioned within the lower portion of said sleeve and an annular hollow cupped cylinder member rigidly attached to said plunger chamber body, the inner and upper faces of which consist of a solid plate and the outer and lower faces of which consist of a strainer member, said inner face being provided with suitable openings to permit entrance of lubricant into the plunger chamber.

8. A lubricating installation comprising a reservoir for supplying lubricant to a conduit system, a pump cooperating with said reservoir and a motor for said pump comprising a horizontally symmetrical weight, a vertical bore through the central portion of said weight, a connecting rod passing upwardly through said bore, a concentric member attached to the top of said connecting rod and an annular member attached to the top of the weight, said members being rigidly connected, both the concentric member and the annular member having contacting downturned flanges which are initially adjustable in respect to each other and which in final position are both substantially below the top of the weight.

9. In a lubricating installation, a pump and reservoir unit having a reservoir enclosure provided with a cover, a relatively large massive inertia-weight-motor above said cover, a relatively thin delicate plunger, a casing for said weight-motor and a pump block with a cylindrical bore receiving said plunger adjacent the bottom of said enclosure, said weight and said plunger being provided with and directly operatively connected together by a relatively thin delicate connecting rod in comparison with the weight extending down through said cover, both said plunger and said connecting rod having negligible mass as compared to the weight-motor, and a rigid longitudinal element enclosing said connecting rod and extending from said casing through substantially the entire height of said enclosure to said pump block to position said pump block substantially below and removed from said casing, the lower end of the casing being provided with an annular insert having a central bore therethrough serving as a bearing for the connecting rod, said bore being interiorly provided with a thread, and said connecting rod being connected with a pin to be received in said thread and be turned therethrough upon an assembly or dismantling.

10. In a lubricating installation, a pump and reservoir unit having a reservoir enclosure provided with a cover, a relatively large massive inertia-weight-motor above said cover, a relatively thin delicate plunger, a casing for said weight-motor and a pump block with a cylindrical bore receiving said plunger adjacent the bottom of said enclosure, said weight and said plunger being provided with and directly operatively connected together by a relatively thin delicate connecting rod in comparison with the weight extending down through said cover, both said plunger and said connecting rod having negligible mass as compared to the weight-motor, and a rigid longitudinal element enclosing said connecting rod and extending from said casing through substantially the entire height of said enclosure to said pump block to position said pump block substantially below and removed from said casing, said rigid longitudinal member taking the form of a tube and said pump being provided with an upwardly projecting tubular member provided with a snap connection for attachment to the lower end of said tube, and whereby the pump may be readily removed from the end of said tube and from its assembly with the connecting rod and inertia-weight-motor.

JOSEPH BIJUR.